Patented Dec. 21, 1943

2,337,524

UNITED STATES PATENT OFFICE 2,337,524

METHOD OF COATING GLASS TUBES

George A. Michael, Boston, Mass., assignor to Sylvania Electric Products Inc., a corporation of Massachusetts No Drawing. Application November 2, 1940, Serial No. 364,100

2 Claims. (Cl. 117—34)

This invention relates to electric gaseous discharge lamps and more particularly to the application of a luminescent material to the inner walls thereof.

Accordingly, an object of this invention is to provide a method of applying luminescent material to the walls of elongated glass tubes.

Other objects, advantages and features will be apparent from the specification below.

In the preparation of luminescent materials for their application to the walls of electric gaseous discharge lamps, it has been proposed to use a ketone such as acetone as the solvent in which nitrocellulose and a plasticizer are dissolved to form the vehicle with which the luminescent powder is mixed. In conjunction with the use of an acetone vehicle, low viscosity nitrocellulose has been used as a lacquer and di-methyl-phthalate as a plasticizer. Due to the nature of these materials, many difficulties have arisen in the attempt to obtain a smooth even coating free from the possibility of peeling.

For example, it has been found that a variation in the temperature of the room in which the coating mixture is being applied to the lamp or tube will very likely cause a density variation and/or streaky coating. The use of a low viscosity lacquer renders an accurate control more difficult. Di-methyl-phthalate carbonizes before ultimate decomposition of the nitrocellulose upon baking takes place, thus presenting a difficulty in completely baking out the tube or lamp.

Due to its tendency towards rapid evaporation the acetone is very likely to leave the coating in a non-oriented state, and thus decrease the adherence of the powder to the glass. Upon standing, acetone suspensions settle out and conglomerate to such a degree that in many case remilling is necessary. Due to the small amounts of lacquer which can be used in an acetone vehicle, a coarse coat is obtained. Coarse coating signifies uneven distribution of particles of powder. Heavy spots are more apt to peel when subject to shock than lighter spots.

I have found that by using an acetate such as butyl-acetate instead of a ketone as the solvent for the vehicle in which to suspend the luminescent powders, and by using a high instead of a low viscosity nitrocellulose and Carbitol as a plasticizer instead of di-methyl-phthalate, most of the above difficulties may be obviated. Carbitol is the trade-name for diethylene glycol mono-ethyl ether.

The proportions between the quantity of the suspension vehicle, the acetate, the lacquer, and the plasticizer may be varied, depending on the kind of powder used, the type of coating desired and the length and diameter of the bulb or tubing being coated. I have found that a desirable coating mixture for a blue tubing may be obtained by ball-milling, for about two hours, a mixture of 1000 grams of luminescent powder such as lead-activated calcium tungstate and 500 cc. of butyl-acetate. I then rinse the mixture with about 270 cc. of butyl-acetate to make sure that none of the mixture is left in the mill. I then add 230 cc. of butyl-acetate, 250 cc. of 1000 second viscosity nitrocellulose and 25 cc. of Carbitol.

The use of suction for flushing and forced air for drying has proved advantageous. However, other means for introducing the solution into the tubing and drying the coating may be used. Due to the longer drying period made necessary by the use of butyl-acetate, two coats may be applied in order to prevent the top of the tube or lamp from having a thinner coating than the remainder thereof. Therefore, after the first flush, I wait about 15 to 30 seconds, about long enough for the top end to start to dry and then I flush the lamp a second time. By thus permitting the top end to start to dry, this first coat serves to reinforce the second coat when it is applied. When the second coat has dried completely, which usually takes about 11 minutes, a uniformly smooth coating with a uniform density at all points along the tube or lamp will result. After the tube has dried, it may then be baked at about 510° C. To further protect the lamp or tubing from the tendency to peel, it should be baked as soon as possible after it has been coated, preferably within 24 hours. Otherwise, moisture and various foreign matters are liable to be absorbed by the coating and thus depreciate its adherence.

By using the above-mentioned materials I have found that the mixture is more readily controllable and is not susceptible to slight temperature variations. Since butyl-acetate has a slower evaporation rate than acetone, the solvent, upon evaporation, leaves a well-oriented powder more firmly adhered to the glass. It has been found that Carbitol will not carbonize before ultimate decomposition of the nitrocellulose upon baking as did di-methyl-phthalate. It has also been found that by using an acetate such as butyl-acetate instead of a ketone such as acetone, more lacquer may be used and thus tend to give more lasting powder dispersion during storage.

Aside from the fact that the butyl-acetate type of suspension vehicle enables the attainment of a smoother, better adhering, uniform coating, is the effect which this vehicle has on the maintenance and life of coating thus applied. Tests have shown that no chipping of the coating will take place even several days after the coating has been applied. This was proved by dropping the tube or lamp so coated on wooden and glass surfaces and bringing two sticks of coated tubing together violently. By coating fluorescent tubing with the materials and in the manner above described, the tubing may be bent without greatly impairing its luminescence at the point of bending.

What I claim is:

1. The method of coating an elongated glass tube for a discharge lamp, comprising: flushing said tube once with a fluorescent material suspension; including butyl-acetate as a solvent, a high viscosity nitrocellulose, and diethylene glycol monoethyl ether as a plasticizer; allowing said deposited coating to partially dry only near the top part of said tube in a time period of the order of 15 to 30 seconds; again flushing said tube with said suspension; drying the resultant coating in a time period of the order of eleven minutes; and thereafter baking said resultant coating within 24 hours, at a temperature of the order of 510° C.

2. The method of coating an elongated glass tube for a discharge lamp, comprising: flushing said tube once with a fluorescent material suspension including butyl-acetate as a solvent, a high viscosity nitrocellulose, and diethylene glycol mono-ethyl ether as a plasticizer; allowing said deposited coating to partially dry only near the top part of said tube in a time period of the order of a few seconds; again flushing said tube with said suspension; drying the resultant coating in a time period of the order of a few minutes; and thereafter baking said resultant coating within 24 hours, at a high temperature.

GEORGE A. MICHAEL.